United States Patent [19]

Vosteen et al.

[11] 3,870,968

[45] Mar. 11, 1975

[54] ELECTROMETER VOLTAGE FOLLOWER HAVING MOSFET INPUT STAGE

[75] Inventors: Robert E. Vosteen, Medina; Bruce Theodore Williams, Lockport, both of N.Y.

[73] Assignee: Monroe Electronics, Inc., Middleport, N.Y.

[22] Filed: Apr. 9, 1973

[21] Appl. No.: 349,420

Related U.S. Application Data

[63] Continuation of Ser. No. 106,749, Jan. 15, 1971, abandoned.

[52] U.S. Cl. ............. 330/207 P, 330/35, 330/30 D, 330/24

[51] Int. Cl. ............................................ H03f 21/00

[58] Field of Search ................. 330/30 D, 35, 207 P

[56] References Cited

UNITED STATES PATENTS

| | | | |
|---|---|---|---|
| 3,509,460 | 3/1970 | Mizraki | 324/111 |
| 3,526,810 | 9/1970 | Williams et al. | 317/16 |
| 3,553,492 | 1/1971 | Bugay | 307/235 |

*Primary Examiner*—Nathan Kaufman

*Attorney, Agent, or Firm*—Albert J. Santorelli

[57] ABSTRACT

An ultrahigh impedance wide-band voltage follower for use as an electrometer amplifier. The input stage comprises a dual channel MOSFET connected as an amplifier, the first channel having a first gate, source and drain, and the second channel having a second gate, source and drain, the input to the voltage follower being supplied to the first gate. An amplifier is connected to the output of the MOSFET input stage, the output of the amplifier constituting the output of the voltage follower. A connection applies the output of the voltage follower back to the second gate, and a protective circuit having zener conduction and breakdown characteristics is connected between the first gate and the output of the voltage follower to protect the MOSFET input stage when subject to an input overload sufficient to cause destruction of the MOSFET. The voltage follower also includes an intergrator selectively connectible between the protective circuit and the output of the voltage follower operative to integrate a voltage present at the output of the voltage follower due to a residual charge at the input to the voltage follower, and inject a neutralizing current to the input of the voltage follower sufficient to neutralize the residual charge.

10 Claims, 3 Drawing Figures

INVENTORS
ROBERT E. VOSTEEN
BRUCE T. WILLIAMS

BY Irons, Stockman, Sears & Santorelli
ATTORNEYS

ELECTROMETER VOLTAGE FOLLOWER HAVING MOSFET INPUT STAGE

This is a continuation of application Ser. No. 106,749, filed Jan. 15, 1971 now abandoned.

BACKGROUND OF THE INVENTION

1. Field of the Invention

The invention relates to an electrometer amplifier which utilizes an ultra high impedance wide-band voltage follower. It has particular utility for use with precision instruments such as an isolation device permitting observation of wide-band phenomena from high impedance, low level sources, and also makes possible high speed, high resolution measurements of surfaces without physical contact.

2. Description of the Prior Art

Electrometer amplifiers are known in the prior art, but prior art electrometer amplifiers have several disadvantages. Although very high input resistance has been a characteristic of available electrometer amplifiers, their input capacitance has been comparable to that of conventional amplifiers, thus precluding their application where capacitance loading is a problem. Prior art electrometer amplifiers also have bandwidth limitations of less than 100KC, which of course further limits their field of use.

Electrometer tubes have typically been used in the past as input devices to electrometer amplifiers. Such tubes however have the following disadvantages:

1. Heaters for the tubes require large power input in comparison to solid state devices.
2. Tube circuits have large voltage drift which is relatively unpredictable
3. Tubes are adversely affected by shock thereby producing a microphonic output.

Solid state devices of current manufacture such as MOSFETs have circumvented the three above enumerated limitations but are readily destroyed should an excessive charge appear on their input gate. Protective techniques typically consisting of a zener diode connected between gate and source have been used to protect these devices from distruction but these introduce intolerable loading due to the loss of five to six orders of magnitude of input current.

SUMMARY OF THE INVENTION

Applicant's invention overcomes these and other disadvantages of prior art electrometer amplifiers. It provides a protection technique wherein the DC current flow is greatly reduced, while the system input resistance remains typical of a good electrometer—in order of $10^{15}$ ohms.

A mechanical input switch has been traditionally employed to discharge any charge accumulated on the input circuitry. This switch creates unwanted input capacitance and typically leaves a very small but finite charge on the amplifier input when the switch opens. Such a finite charge on the extremely small input capacitance of applicants'voltage follower results in an intolerable voltage offset thus necessitating a new technique to eliminate this problem. Applicants utilize an electronic capacitance discharge technique which dependably reduces the residual voltage to less than 1 millivolt.

The input current of available electrometer amplifiers is generally limited to the normal input current of the amplifier input stage. The unique character of applicants' electrometer, however, permits bucking out residual input current to less than $10^{16}$ amperes.

Further applicants' invention, through the use of negative feedback and bootstrapping, reduces the input capacitance to less than one one thousandths of that of conventional circuitry previously employed—in this case to less than 0.01 picofarads. Applicants have thus produced a device whose loading effect on the source to which it is connected is significantly lower than that previously practiable. Specifically, its capacitive loading is nearly negligible as compared to prior art electrometer amplifiers.

Although a capacitance "nulling" technique employing a noninverting amplifier with gain which permits "nulling" the effective capacitance by employing an adjustable capacitance between output and input to balance out the effect of finite input capacitance has previously been used, the effective "nulling" is a function of gain, input and feedback capacitance stability, thus an overcompensating unstable condition was possible. In applicants' invention, however, the feedback is unconditionally stable and requires no adjustments.

DETAILED DESCRIPTION OF THE INVENTION

Figures 1, 2B:
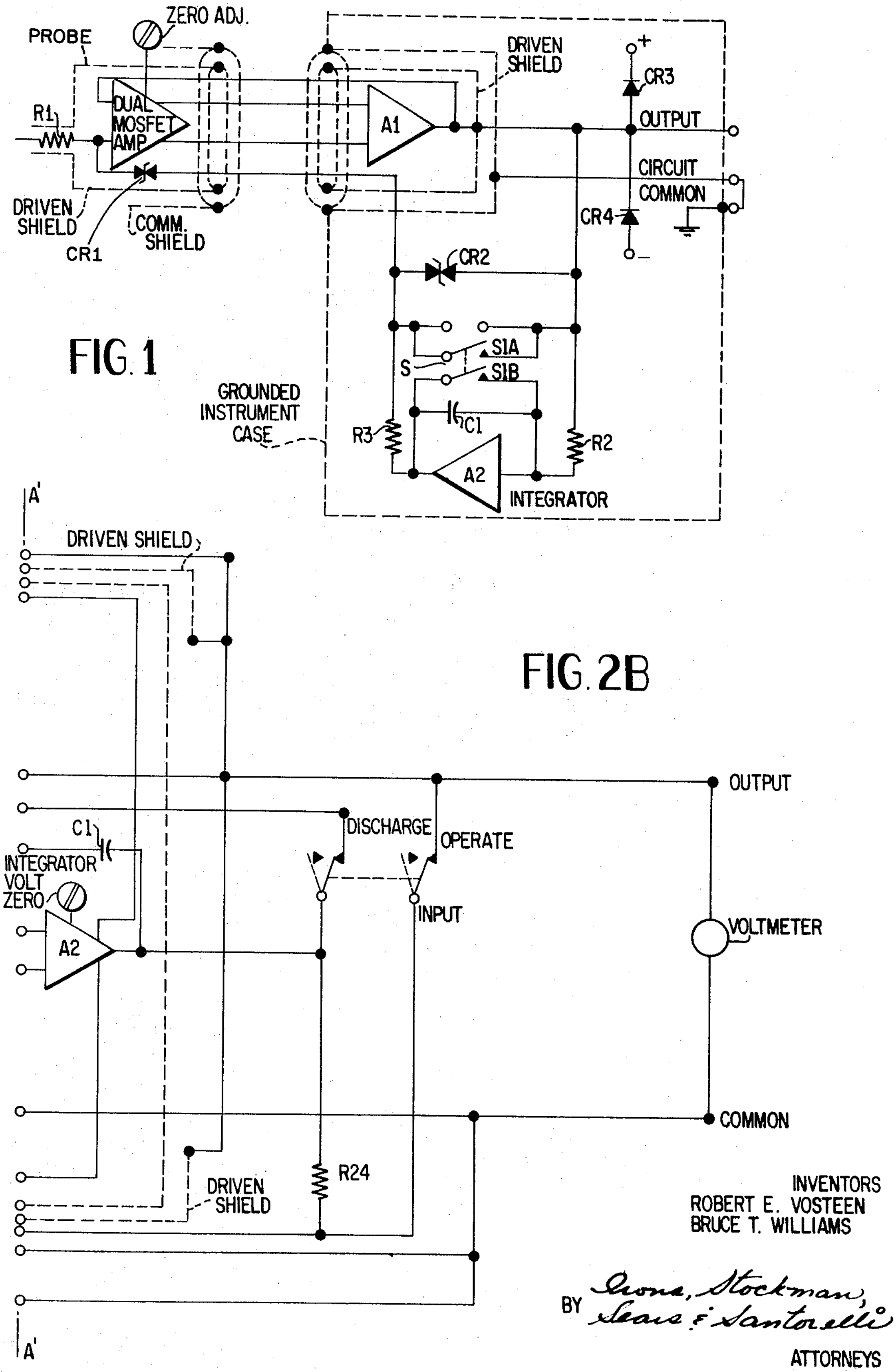
FIG. 1 is an electrical schematic diagram of the electrometer voltage follower according to the invention.

FIG. 1 is a simplified schematic diagram of applicants' electrometer voltage vollower which comprises the subject of their invention. The probe portion of the circuit is so labeled and includes input resistance R1 which functions as a surge limiting resistor to permit the protective zener element CR1 described below to handle any reasonable overvoltage applied to the input. The probe includes a dual MOSFET connected to input resistor R1, which is appropriately wired to function as an amplifier. Associated with the dual MOSFET amplifier is a zero adjustment control, more fully described below with respect to FIG. 2. The outputs of the dual MOSFET amplifier are connected via a cable to the input terminals of differentially connected operational amplifier A1, which as shown is housed in the main frame portion of the system. The dual MOSFET amplifier in the probe in conjunction with the differential amplifier A1 in the main frame is connected to function as a voltage follower by connecting the output of the voltage follower (the output of differential amplifier A1) to the negative input terminal of the dual MOSFET amplifier. A circuit common shield is also provided as illustrated in FIG. 1. The driven and common shields are explained more fully hereafter with reference to FIG. 2.

It has been found that the base-emitter junction of certain types of small signal silicon transistors exhibit a zener breakdown in the area of 10 volts (well below the destructive limit of unprotected MOSFET gates) and most importantly a resistance of approximately $10^{11}$ ohms at voltages of less than one volt. While $10^{11}$ ohms would be an unsatisfactory input resistance for a good electrometer amplifier, if the amplifier had an open loop gain of several thousand was wired as a voltage follower, the $10^{11}$ ohm protective device (typically two devices wired series back-to-back as a double anode zener diode) could be connected between the input and output of the voltage follower and have its equivalent input resistance increased to well in excess of $10^{14}$ ohms, thus constituting an acceptable input resistance for an electrometer amplifier when operating in the linear range.

Thus, element CR1 comprises two zener diodes connected series back-to-back as a double anode zener diode between the input and output of the voltage follower to function as an input overvoltage protective device, as explained in the previous paragraph. Additionally, diode CR3 is connected between the output of the voltage follower and the positive supply terminal, and diode CR4 is connected between the output of the voltage follower and the negative supply terminal. The described connection of diodes CR3 and CR4 constrains the output of the electrometer amplifier to the limits of its power supply, under overload conditions.

The double anode zener diode element CR1 connected in the feedback path from the output of the electrometer voltage follower to the positive terminal of the input to the dual MOSFET amplifier will conduct during input overload. The electrometer voltage follower input will then never be subject to a destructive voltage level if a reasonably large resistance R1 is connected at the input to the dual MOSFET amplifier, to which zener diode CR1 is also connected.

The input voltage stability of currently available MOSFETs permits their use in a solid state follower circuit with a short-term stability in the order of tens of microvolts. It is thus apparent that if a small intentional voltage offset error is introduced between the follower input and output that this offset will introduce a current into the electrometer input circuit via the $10^{11}$ to $10^{12}$ ohm input protective device.

The typical input current for an unprotected MOSFET is in the order of $10^{-14}$ to $10^{-15}$ amps. The above offset current can thus be adjusted to be equal and opposite to the above input current with sufficient precision and stability to reduce the net input current to less than $10^{-16}$ amperes.

As was previously mentioned, a physical switch will introduce both capacitive input loading and an undesired residual offset charge at the instant of switch opening. Although this minute charge is generally tolerable when associated with the several picofarad input capacitance of a normal electrometer amplifier, it is intolerable when it appears across the equivalent input capacitance of as little as 0.01 picofarads associated with the input of the electrometer follower according to the invention.

The above mentioned double anode zener diode protective device CR1 can thus perform an additional useful function as the discharge path for undesired charge accumulation when used in conjunction with additional circuitry.

An additional operational amplifier A2 is wired as an integrator by the connection of capacitor C1 in the feedback path between the output and the input of amplifier A2, and the connection of resistor R2 between the output of the electrometer voltage follower and the input of operational amplifier A2. Double-pole, single-throw switch S1 is provided as shown in FIG. 1 Switch S1 comprises two switch sections. The S1B switch section is connected between the input and the output of operational amplifier A2 and S1A switch section is connected between zener element CR1 and the output of the electrometer voltage follower.

Switch S1 is normally closed thereby connecting zener element CR1 to the output of the electrometer voltage follower and simultaneously shorting out the integrator capacitor C1 and operational amplifier A2. The function of switch section S1B is to prevent saturation of integrator amplifier A2 when switch section S1A is closed. The function of switch section S1A is to restore zener protective device CR1 to the bootstrapped connection under normal operation of the voltage follower when switch S1 is closed. In the normal condition, the integrator therefore does not operate. Resistor R3 is connected between zener element CR1 and the output of operational amplifier A2 and functions to prevent shorting the output of the electrometer voltage follower to the input in the normal "operate" mode.

When it is desired to discharge any residual charge, switch S1 is opened. This connects the integrator between the output of the electrometer voltage follower amplifier and the input protective zener element CR1, through resistor R3.

If a voltage exists at the output of the electrometer voltage follower due to a residual charge at the input to the voltage follower, this voltage will be integrated by the integrator and the output of the integrator will inject a corresponding current into the electrometer voltage follower input via zener element CR1, sufficient to neutralize any residual charge present at the input to the electrometer voltage follower. The output voltage capability of the integrator is chosen to be sufficient to cause a zener breakdown in zener element CR1 to insure rapid discharge of any residual input charge. An equilibrium condition is achieved when the output from the electrometer voltage follower is driven to zero by the integrator output connected to the input of the voltage follower through zener element CR1. At this point, a negligible voltage drop exists across switch section S1A and consequently, switch S1 can be closed to restore normal operation of the electrometer voltage follower.

CR2 is a dual zener diode similar to CR1 but of slightly higher zener breakdown voltage such that CR1 breaks down first. It is connected between the electrometer voltage follower output and the anode of CR1 which is not connected to the common connection of resistor R1 and gate G1. It insures the overload discharge path under the condition when switch S1 is open.

It is also seen with reference to FIG. 1 that operational amplifier A1 is surrounded by a driven shield which, as explained with reference to the driven shield surrounding the dual MOSFET amplifier. functions to reduce the input capacity to the amplifier. A circuit common shield is also provided for operational amplifier A2.

Figure 2A:
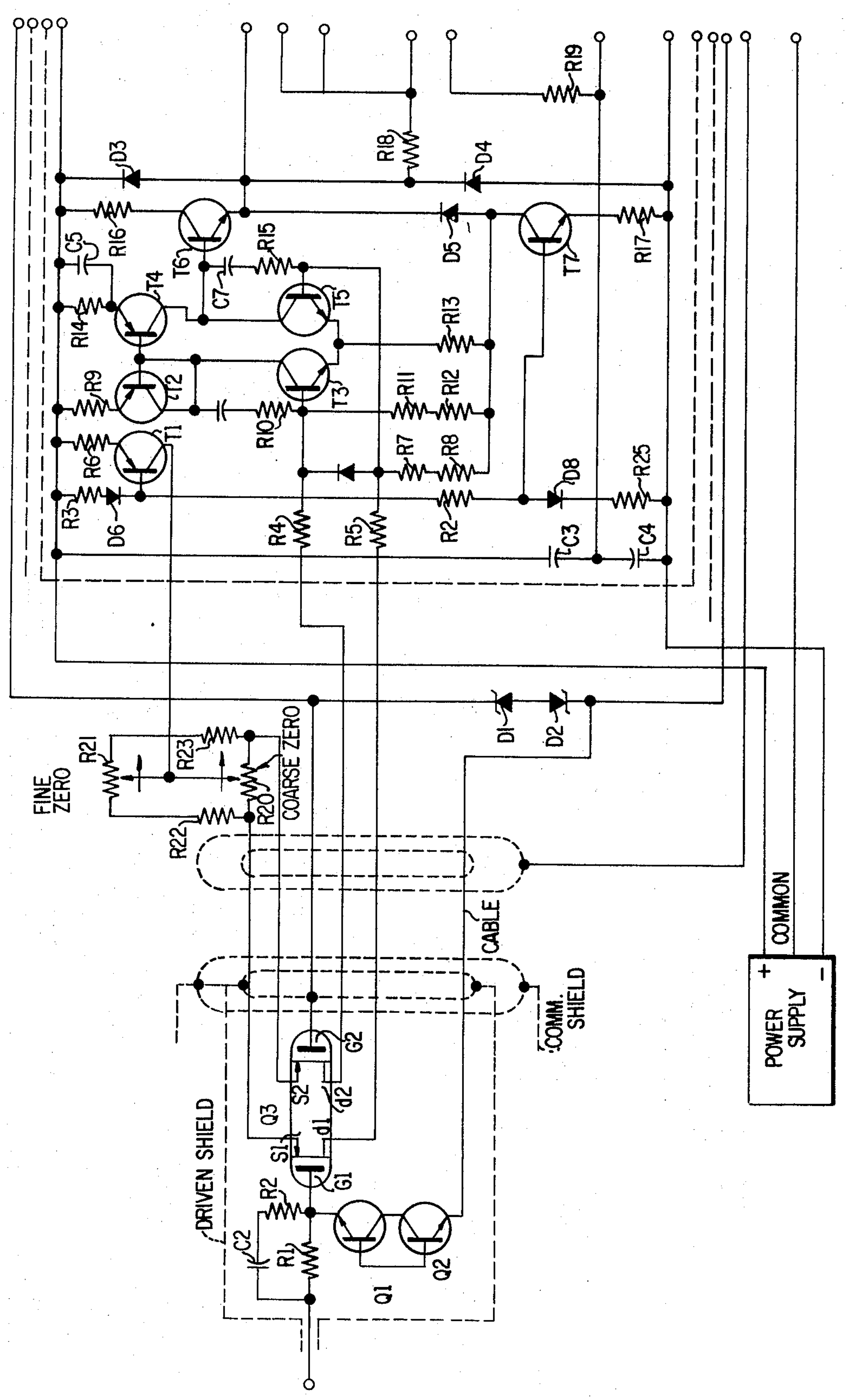
FIG. 2 is a more detailed electrical schematic diagram of the electrometer voltage follower according to the invention, particularly illustrating one type of operational amplifier that may be used to provide high voltage gain for the electrometer voltage follower.

FIG. 2 illustrates in more specific detail the electrometer voltage follower according to applicant's invention.

It is well known that if a differential operational amplifier has its "output" fed back to its "minus input," it becomes a precision voltage follower. provided its open loop gain is in excess of 1000, its output follows a signal applied to its "plus input" with an error of less than 0.1 percent, or expressing it another way, its gain exceeds +0.999 approaching unity in the limit as the open loop gain approaches infinity. If an operational amplifier were designed using MOSFETs (Metal Oxide Semiconductor Field Effect Transistors) as input devices for the differential input stage and if those MOSFETs were operated without protective gate-to-source zener diodes, the resultant voltage follower would possess exceptionally high input resistance. If the input connection were carefully shielded and this shield were connected to the voltage follower output instead of ground, the effective capacitance loading the input would be reduced to a value approximating the passive shield capacitance divided by the open loop amplifier gain—assuming negligible phase shift in the amplifier. Similarly, a passive resistance connected output-to-input would be increased by a factor approximating the resistance multiplied by the open loop amplifier gain again assuming negligible phase shift.

It is implied, therefore, that by this simple feedback connection that the effective input impedance of the open loop amplifier is multiplied by a factor approximating the gain when the amplifier is connected as a voltage follower. This would be true were it not for the fact that typical amplifiers employ circuitry such that the drains of the MOSFETs would be at a static potential and therefore the drain-to-gate capacitance and drain-to-gate leakage resistance would not be fed back and therefore would shunt the input impedance improvement realized by feedback. This limitation can be circumvented if the drains of the MOSFET input stage can be bootstrapped to the amplifier output thus reducing this capacitance and increasing leakage resistance in the same manner as described above for passive capacitance and resistance connected output to input.

Although the "driven shield" principle can be employed to reduce input capacitance to a value approximating the physical capacitance divided by the open loop gain, applicants' invention is directed to an instrument whose input capacitance is less than 0.01 picofarads. This cannot be achieved if the gain approximates 1000 and the capacitance exceeds 10 picofarods. It is thus essential that the total open loop input capacitance be kept low as compared to 10 picofarads. This dictates that the input devices be installed in a separate probe connected to the main electronics by means of an interconnecting cable as shown in FIGS. 1 and 2.

The probe portion of applicants' invention as shown in FIG. 2 comprises a dual P channel MOSFET. Channel A comprises source S1, gate G1 and drain *d*1 and channel B comprises source S2, gate G2 and drain *d*2. Transistors Q1 and Q2 comprise NPN transistors having common base and common collector connections to function as a protective device having zener breakdown characters. The emitter of transistor Q1 is connected to the series connection of resistor R1 and gate G1, and the emitter of transistor Q2 is connected to the output of the integrator. Thus, a zener protective circuit is interposed between the output of the electrometer voltage follower and the input thereto. Resistor R1 is connected between the input terminal and gate G1 of the dual P channel MOSFET and functions as a surge limiting resistor to permit the protective zener element comprising transistors Q1 and Q2 to handle any reasonable overvoltage applied to the input. The series connection of capacitor C2 and resistor R2 is connected across the resistor R1, and functions as a shunt path to bypass high frequency signals without subjecting the input to destructive discharge currents.

A driven shield fed from the output of the voltage follower is associated with the input probe and comprises the fed back shield utilized to drive the input capacitance to a negligible value. The shield connected to line common is provided at the input probe to serve as a convenient connection, which would normally be grounded, for low level input signals, as well as a protective shield for the output circuit in the event it is subject to gross external interference.

The probe is connected to the main frame by a cable as shown in FIGS. 1 and 2. Source S1 of MOSFET Q3 is connected to one end of resistor R20 and source S2 of MOSFET Q3 is connected to the other end of resistor R20. The series connection of resistors R22, R21 and R23 is connected across resistor R20. Resistors R20 and R21 have separately controllable variable taps associated therewith, the taps having a common electrical connection. Resistors R20 and R21 are equal in resistance value, as are resistors R22 and R23. The described resistor and tap connections function as the zero voltage adjustment control, with resistor R20 functioning as the coarse zero control and resistor R21 functioning as the fine zero control. Thus, gross zero offset is provided by adjusting the tap associated with resistor R20 and fine zero adjustment is provided by adjusting the tap associated with resistor R21. The zero adjusting network is therefore in the source circuit of the MOSFETs, and its operation is more fully described in U.S. Pat. No. 3,077,566 entitled "Transistor Operational Amplifier," filed in the name of Robert E Vosteen, a coinventor of the instant application.

As discussed above, the desired performance of the system comprising the invention necessitates external bootstrapped MOSFET protective devices which function under overload conditions to prevent destruction of the input stage of the electrometer voltage follower. The protective devices include not only the zener protective element comprising transistors Q1 and Q2 but also zener diodes D1 and D2, connected to function as a double anode diode between the emitter of transistor Q2 and gate G2 of channel B and performs the function of zener device CR2 of FIG. 1. Thus, elements Q1–Q2 and D1–D2 have zener breakdown characteristics to limit voltages associated with MOSFET Q3 to safe nondestructive values.

Zener diodes D1 and D2 are selected to break down at a breakdown voltage slightly above the breakdown of the zener input protective device comprising transistors Q1 and Q2. Similarly the integrator output capability must exceed the breakdown rating of the transistor Q1 and Q2 to insure rapid discharge of input charge accumulations via the zener type conduction of transistors Q1 and Q2 in the input discharge mode of operation.

The common connection of the taps of the zero adjustment controls is connected to the collector of NPN transistor T1, which is connected to function as a constant source load for the MOSFET input stage.

Drain d1 of channel A is connected through resistor R5 to the base of NPN transistor T5, and drain d2 of channel B is connected through resistor R4 to the base of NPN transistor T3. Resistors R4 and R5 function to stabilize the high frequency performance of the closed loop amplifier. Resistor R11 is connected at one end to the common connection of resistor R4 and the base of transistor T3, and the other end is connected through resistor R12 to the collector of transistor T7. Similarly, resistor R7 is connected at one end to the common connection of resistor R5 and the base of transistor T5, and the other end is connected through resistor R8 to the collector of transistor T7. Resistors R7 and R11 function as the drain load resistors for the input MOSFET. They preferably comprise precision resistors with tracking temperature coefficients. The described series connection of resistors R8 and R12 to resistors R7 and R11, respectively, function to trim the drain current. By trimming the drain current through the proper selection of resistors R8 and R12, it is possible to trim the drift of the system to tens of microvolts per degree centigrade. It has been established that the drift of a MOSFET with temperature is a function of the drain current, and excellent trimming of the drift with the described circuit may be accomplished by selecting transistor Q3 to comprise a dual matched MOSFET having good tracking characteristics.

The input MOSFET drains thus feed the bases of transistors T3 and T5, which are connected to comprise a differential stage. The collector of transistor T3 is connected to the base of PNP transistor T4 and, through PNP transistor T2, to resistor R9. The base-emitter junction of transistor T2 compensates for the variation in voltage between the base and emitter of transistor T4 with temperature change. The emitter of the transistor T4 is connected to resistor R14. The other ends of resistors R9 and R14 are connected to the positive power supply terminal. Resistors R9 and R14 have equal resistance, and the circuit comprising resistors R9 and R14 and transistors T2 and T4 functions as a unity current gain inverter with the current signal to the collector of transistor T4 being essentially equal to the current from transistor T3 feeding the common base connection of transistors T2 and T4. The collector of transistor T4, is connected to the collector of transistor T5, with the result that the signal current from transistor T4 is essentially equal and opposite to the current signal from transistor T5. Thus, the effect on a load fed from this common connection is additive, as described in U.S. Pat. No. 3,077,566 identified above.

The described common collector output configuration in addition to being temperature compensated constitutes a current source of very high impedance and when fed to a high impedance load, provides a very high voltage gain for the stage comprising transistors T3 and T5 in combination with transistors T2 and T4. The high impedance load is realized by feeding the common collector output of transistors T4 and T5 to the base of NPN transistor T6, which is connected to function as an emitter follower. As shown in FIG. 2, the output of the emitter follower may be considered to be the output of the electrometer voltage follower comprising the invention. Corresponding FIG. 2 to FIG. 1, diodes D3 and D4 of FIG. 2 correspond in connection and operation to diodes CR3 and CR4 of FIG. 1.

It was described above that the input MOSFET drains must be bootstrapped to the system output. In this regard diode D5 comprises a zener diode connected between the emitter of the transistor T6 and the collector of NPN transistor T7, the latter transistor being connected to function as a constant current load for transistor T6. The junction of the anode of diode D5 and the collector of transistor T7 is the negative supply for all prior discussed circuitry including the input MOSFET and the operational amplifier high voltage gain stage, the latter corresponding to amplifier A1 of FIG. 1. This negative supply is connected through the low impedance provided by diode D5 to the system output, and to the static system negative supply through transistor T7. Because the impedance of diode D5 is a few ohms while that of transistor T7 is on the order of hundreds of thousands of ohms, their common connection follows the system output with excellent fidelity thus bootstrapping the drain circuit of the input MOSFET in the desired fashion.

In order to further minimize undesired input capacitance to ground, the main amplifier is surrounded by electrostatic shield which is similarly connected to the output and driven to reduce excessive capacitance.

The feedback connection between the output of the emitter voltage follower and the negative input of the MOSFET is shown by the connection from the output to gate G2 of channel B. Its function has been described with respect to FIG. 1.

An integrator circuit comprising inter alia operational amplifier A2 is also shown in FIG. 2. Capacitor C1 is shown as connected between the output and input of amplifier A2 and in conjunction with resistor R18 connected between the input to the amplifier and the output of the electrometer voltage follower, causes the amplifier to function as an integrator. Integrator voltage zero control is operatively associated with the integrator for zero voltage adjustment purposes. Switch S1 is also shown in FIG. 2. As described with respect to FIG. 1, it disconnects the integrator from the circuit in the normal operate mode (shown in FIG. 2) and connects the integrator in the circuit when it is switched to the discharge position (shown by the broken line position of the movable contacts of switch S1).

In the operate position shown in FIG. 2, switch section S1A is closed and directly connects the output of the electrometer voltage follower to the zener type protective circuit comprising transistors Q1 and Q2. Switch section S1B effectively shorts integrator capacitor C as explained with reference to FIG. 1.

When switch S1 is switched to the discharge position, the integrator circuit including integrator capacitor C6 is interposed between the output of the emitter voltage follower and the zener type selective element comprising transistors Q1 and Q2. As explained with reference to FIG. 1, this causes any residual charge existing at the input of the electrometer voltage follower to be neutralized.

A power supply having positive, negative and common supply terminals is provided for the system as shown in FIG. 2 to provide the proper operating voltages for the circuit. The resistors, capacitors and diodes not discussed herein but shown in the FIG. 2 function in conventional manner understood by those in the art and detailed discussion thereof is not required for an understanding of applicants' invention.

A Voltmeter or any other type of voltage indicator such as an oscilloscope may be connected between the output of the electrometer voltage follower and the common connection to provide an indication of the output voltage as desired.

The differential operational amplifier shown in FIG. 2 thus employs MOSFETS for its input stage. The electrometer voltage follower according to the invention has a very high open loop gain and is connected as a unity gain, non-inverting amplifier.

The polarities of elements such as diodes and the particular types of transistors employed may be varied with corresponding changes in the polarity of the biasing voltages applied thereto as known by those skilled in the art without departing from the spirit of the invention.

We claim:

1. An ultrahigh impedance wide-band voltage follower for use as an amplifier comprising, a differentially connected operational amplifier circuit to operate as a voltage follower having an input stage comprising a dual channel MOSFET, the first channel having a first gate, source and drain, and the second channel having a second gate, source and drain, the first and second channels being connected as an amplifier with the input to the voltage follower being supplied to the first gate, and the output from the input stage being at the first and second drains, an amplifier connected to the output of the MOSFET input stage, the output of the amplifier constituting the output of the voltage follower, feedback means to apply the output of the voltage follower back to the second gate,
   a first protective device having zener conduction and breakdown characteristics,
   an integrator, and
   switch means operable to a first condition to connect the first protective device between the first gate and the output of the voltage follower to protect the MOSFET input stage when subject to an input overload sufficient to cause destruction of the MOSFET, and to a second condition to interpose the integrator between the output of the voltage follower and the first protective device to integrate a voltage present at the output of the voltage follower due to a residual charge at the input to the voltage follower, and inject a neutralizing current to the input of the voltage follower through the first protective device sufficient to neutralize the residual charge.

2. An ultrahigh impedance voltage follower as recited in claim 1 wherein the amplifier comprises an operational amplifier.

3. An ultrahigh impedance voltage follower as recited in claim 1 further comprising,
   means to bootstrap circuit the first and second drains to the output of the voltage follower to reduce the input capacitance of the voltage follower.

4. An ultrahigh impedance voltage follower as recited in claim 3 further comprising,
   a probe housing the input stage, a driven shield surrounding the probe housing to drive the input capacitance in conjunction with the bootstrap connection to a negligible value.

5. An ultrahigh impedance voltage follower as recited in claim 4 further comprising,
   a shield connected to a common connection of the voltage follower functioning as a convenient ground connection for low level input signals and as a positive shield should the output of the input stage be subject to gross external interference.

6. An ultrahigh impedance voltage follower as recited in claim 1 wherein the integrator output capability exceeds the zener breakdown rating of the first protective device to insure rapid discharge of any residual charge at the input to the voltage follower through zener conduction of the first protective device.

7. An ultrahigh impedance voltage follower as recited in claim 6 further comprising,
   a second device including a double zener diode connected to function as a double anode zener diode connectible across the integrator when the means operable between first and second conditions are operated to the second condition.

8. An ultrahigh impedance voltage follower as recited in claim 7 wherein the zener breakdown voltage of the second protective device slightly exceeds the breakdown voltage of the first protective device.

9. An ultrahigh impedance voltage follower as recited in claim 1 further comprising,
   means to intentionally introduce a small voltage offset error between the voltage follower input and output to correspondingly introduce a current into the voltage follower input through the first protective device that is equal to the first gate input current.

10. An ultrahigh impedance voltage follower as recited in claim 1 further comprising,
   zero adjustment control means connected to the MOSFET input stage to correct for voltage zero offset thereof.

* * * * *